(12) United States Patent
Burns et al.

(10) Patent No.: US 7,806,424 B2
(45) Date of Patent: Oct. 5, 2010

(54) FIFTH WHEEL HITCH ASSEMBLY

(75) Inventors: David J. Burns, Salt Lake City, UT (US); Justin C. Schow, West Jordan, UT (US); Erik M. Mumford, Midvale, UT (US)

(73) Assignee: Modern Equipments Sales, L.C., Salt Lake City, UT (US)

( * ) Notice: Subject to any disclaimer, the term of this patent is extended or adjusted under 35 U.S.C. 154(b) by 991 days.

(21) Appl. No.: 10/996,910

(22) Filed: Nov. 24, 2004

(65) Prior Publication Data
US 2006/0108770 A1   May 25, 2006

(51) Int. Cl.
B62D 53/06   (2006.01)

(52) U.S. Cl. .............. 280/433; 280/437; 280/438.1; 280/441

(58) Field of Classification Search .......... 280/407.1, 280/433, 437, 489, 438.1, 441, 389
See application file for complete search history.

(56) References Cited

U.S. PATENT DOCUMENTS

| | | | | |
|---|---|---|---|---|
| 1,990,700 | A * | 2/1935 | Kinne | 280/425.1 |
| 2,640,707 | A * | 6/1953 | Kayler | 280/437 |
| 2,676,033 | A * | 4/1954 | Housh et al. | 280/438.1 |
| 2,906,545 | A * | 9/1959 | Page | 280/438.1 |
| 2,978,259 | A * | 4/1961 | Buisson | 280/407.1 |
| 3,073,624 | A * | 1/1963 | Thomas | 280/438.1 |
| 3,082,021 | A * | 3/1963 | Rugg | 280/438.1 |
| 3,087,748 | A * | 4/1963 | Livelsberger et al. | 410/64 |
| 3,181,480 | A * | 5/1965 | Sherrie et al. | 410/62 |
| 3,241,860 | A * | 3/1966 | Janeway | 280/438.1 |
| 3,287,038 | A * | 11/1966 | Candlin, Jr. et al. | 403/18 |
| 3,337,170 | A * | 8/1967 | Remy et al. | 410/61 |
| 3,358,954 | A * | 12/1967 | Smith et al. | 410/59 |
| 3,396,926 | A * | 8/1968 | Shelton et al. | 410/59 |
| 3,486,467 | A * | 12/1969 | Coulson | 410/62 |
| 3,536,282 | A * | 10/1970 | Ferris | 410/58 |
| 3,826,516 | A | 7/1974 | Weber | |
| 3,869,147 | A * | 3/1975 | Fry | 280/438.1 |
| 3,870,340 | A | 3/1975 | Winter | |
| 4,444,408 | A | 4/1984 | Goth | |
| 4,671,527 | A * | 6/1987 | Wilson et al. | 280/441.1 |
| 5,026,229 | A * | 6/1991 | Matyas et al. | 410/60 |
| 5,054,804 | A * | 10/1991 | Stewart | 280/435 |

(Continued)

OTHER PUBLICATIONS

*Valley Industries: Professional Towing Products*, 2004, pp. Cover, 33, 35-38, 112-116.

(Continued)

*Primary Examiner*—Lesley Morris
*Assistant Examiner*—Maurice Williams
(74) *Attorney, Agent, or Firm*—Kunzler Needham Massey & Thorpe

(57) ABSTRACT

A fifth wheel hitch for towing a trailer behind a motor vehicle is adjustable between a forward position and a rearward position. The fifth wheel hitch includes a base assembly for mounting to the motor vehicle, head assembly for engaging the trailer and at least one pivoting arm coupled between the base assembly and the head assembly. The head assembly moves in an arcuate path between the forward position and the rearward position as the pivoting arm articulates relative to the base assembly. Once positioned in the forward or rearward position, the head assembly is locked relative to the base assembly so as to prevent further movement.

43 Claims, 10 Drawing Sheets

U.S. PATENT DOCUMENTS

| | | |
|---|---|---|
| 5,240,270 A | 8/1993 | Colibert |
| 5,464,241 A * | 11/1995 | Flater .................... 280/425.1 |
| 5,529,329 A | 6/1996 | McCoy |
| D378,077 S | 2/1997 | Lindenman et al. |
| 5,707,070 A | 1/1998 | Lindenman et al. |
| D395,025 S | 6/1998 | Lindenman et al. |
| 5,851,021 A | 12/1998 | Van Kley |
| 6,113,125 A | 9/2000 | Colibert et al. |
| 6,170,850 B1 | 1/2001 | Works |
| 6,247,720 B1 | 6/2001 | Linger et al. |
| 6,357,777 B1 | 3/2002 | Linger et al. |
| 6,386,570 B2 | 5/2002 | Linger et al. |
| 6,398,250 B1 | 6/2002 | Hashman |
| 6,474,674 B2 | 11/2002 | Piercey, III |
| 6,485,045 B1 | 11/2002 | King |
| 6,488,305 B2 | 12/2002 | Laarman |
| 6,554,310 B2 * | 4/2003 | Babin ...................... 280/441.1 |
| 7,100,935 B1 * | 9/2006 | Dunbar ...................... 280/433 |
| 2003/0038452 A1 | 2/2003 | Lindenman et al. |
| 2003/0160429 A1 * | 8/2003 | McCoy et al. ............... 280/433 |
| 2004/0145151 A1 | 7/2004 | Grinde et al. |

OTHER PUBLICATIONS

*Xtender: Slider by RBW.* "Sliding Fifth Wheel Hitch System: User Guide Supplement."

*Reese Product Catalog*, 2004, pp. Cover, 105-109, 114, 115, 144-153.

*Carter Distributing: 2004 RV Parts & Accessories*, 2004, pp. Cover, 330-333, 337, X82-X87.

* cited by examiner

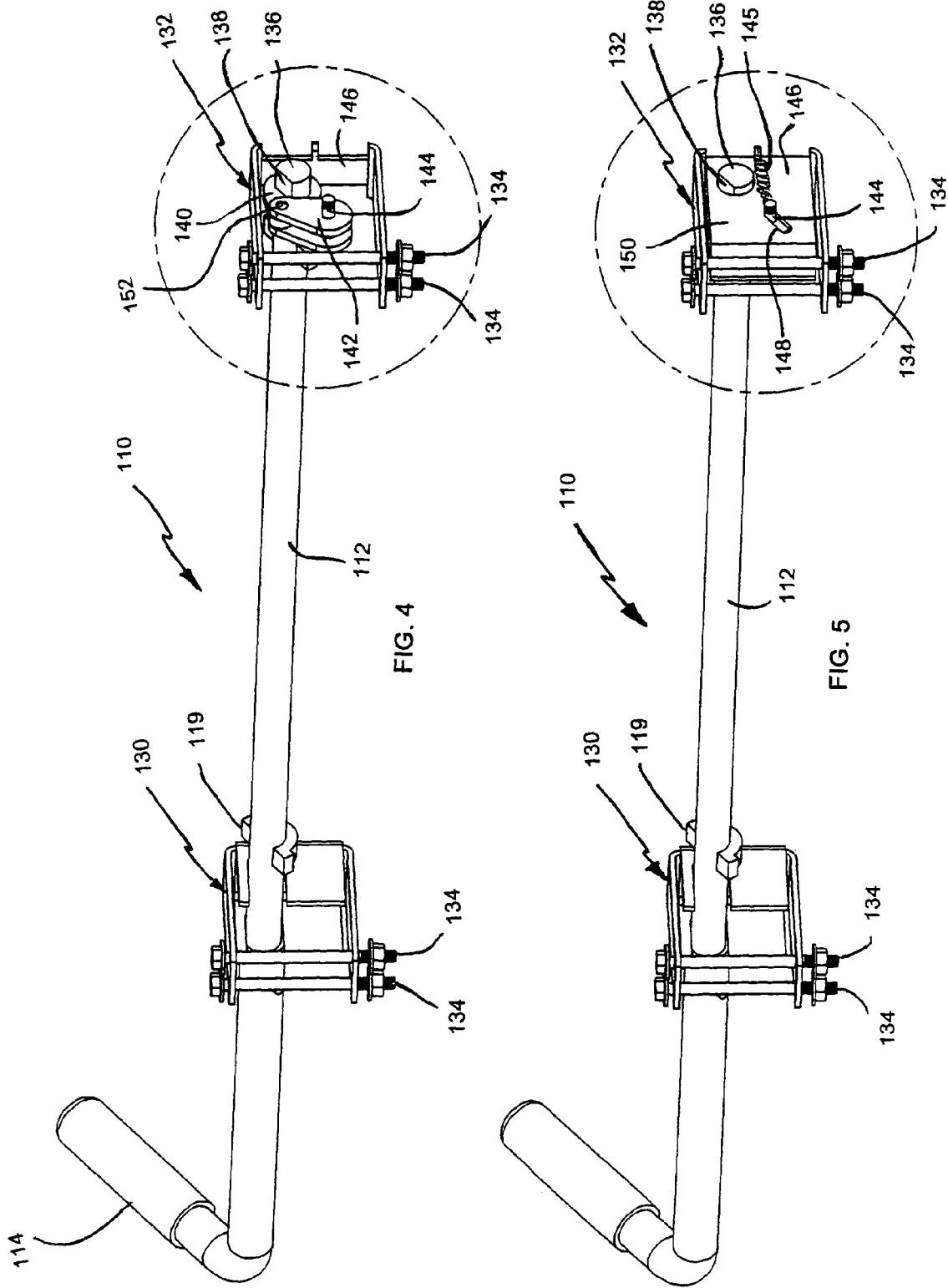

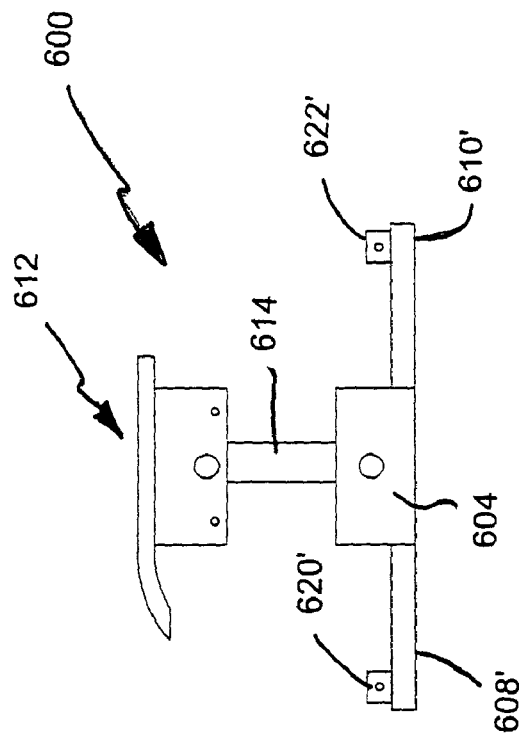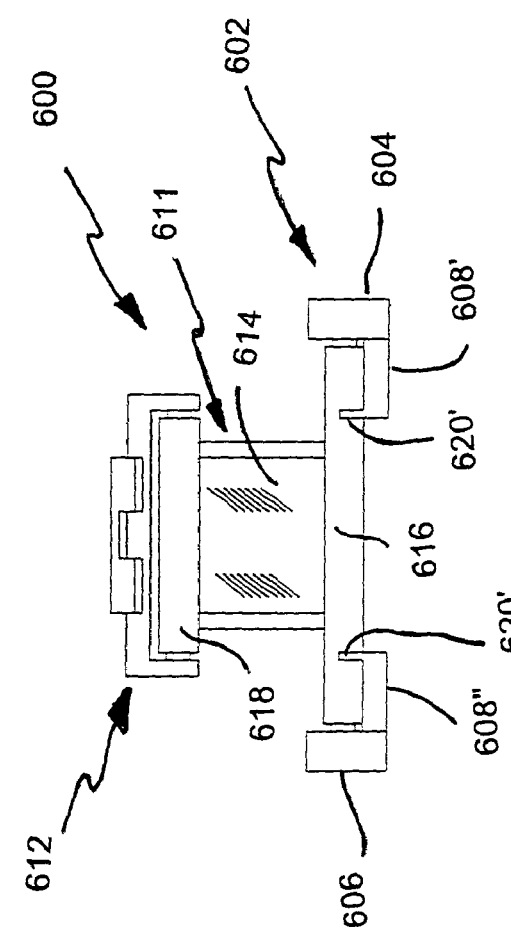

FIFTH WHEEL HITCH ASSEMBLY

FIELD OF THE INVENTION

The present invention relates generally to towing devices and, more particularly, to an adjustable fifth wheel hitch attachment for enhanced maneuverability in limited or tight operating areas.

BACKGROUND OF THE INVENTION

Fifth wheel hitches have been used for decades to tow a trailer behind a vehicle. Conventional fifth wheel hitches typically include a support frame for mounting the hitch to the towing vehicle, such as, for example, to a bed of a pickup truck and a head assembly which includes the mechanism for attaching the hitch assembly to a king pin of the fifth wheel trailer.

The support frame of conventional fifth wheel hitches often includes a pair of base rails that are bolted to the bed and/or frame of the truck, side brackets that are releasably mounted to the base rails and a head support mounted to the side brackets. The head assembly is mounted to the head support by means of a trunnion arrangement allowing for pivotal fore-and-aft movement relative to the side brackets.

For fifth wheel hitches designed to couple to a king pin-type fifth wheel, the head assembly includes a jaw assembly operable by means of a control handle. The jaw assembly is specifically adapted to releasably engage and hold the king-pin of the trailer.

Conventional fifth wheel trailer hitches are typically centered over the axles of the rear wheels of a towing vehicle so as to place the tongue-weight of the vehicle over the rear tires. While this results in a desired weight positioning of the trailer relative to the towing vehicle for traveling at highway speeds, it also often positions the front of the trailer relatively close to the cab of the towing vehicle. When maneuvering at low speeds, the turning radius of the trailer and towing vehicle will be limited by the proximately of the front of the trailer to the cab of the towing vehicle. Thus, the closeness of the clearance between the towing vehicle and the trailer can significantly limit the maneuverability of the towing vehicle and trailer when tight corning is desired.

In order to address the disadvantage in maneuvering a trailer using conventional fifth wheel trailer hitches, various attempts at adjustable fifth wheel hitches have been made. It has been found that by temporarily moving the hitch assembly rearward in the towing vehicle, clearance between the towing vehicle and the trailer is increased, thereby allowing for greater maneuverability of the towing vehicle and trailer.

One such hitch is disclosed in U.S. Pat. No. 6,247,270 to Linger et al. The hitch described in Linger et al. is typical in the art of an adjustable fifth wheel hitches that can move between first and second positions. Linger et al. includes a pair of spaced guide rails upon which a pair of rollers are positioned. The rollers are coupled to a pair of upright assemblies that support the head assembly. Upon movement of the rollers relative to the guide rails, the head can move between first and second positions. The result is a hitch that moves linearly between the first and second positions. The hitch is actuated between the first and second positions by driving the towing vehicle forward to move the head assembly to a rearward position and driving the towing vehicle in reverse to move the head assembly to a forward position. The head assembly can be locked in either the forward or rearward positions relative to the guide rails.

A principle problem with such linearly moving, adjustable hitch assemblies is the ability of such adjustable hitches to bind during movement between the first and second positions. As a significant load may be present on the hitch (both vertically and horizontally), if the trailer is not positioned directly behind the towing vehicle when adjustment of the hitch is being made, the roller assemblies can easily bind relative to the guide rails as one roller assembly moves ahead or behind the other roller assembly. Such binding can result in damage to the hitch assembly and/or the inability to move the hitch assembly to a second position where it can be locked to prevent further movement of the head assembly relative to the towing vehicle.

Accordingly, there exists a need in the relevant art to provide an adjustable fifth wheel hitch that is capable of selectively moving the head assembly of the hitch rearward for greater maneuverability at low speeds and forward for greater stability when traveling at high speeds in a smooth, non-binding manner.

Furthermore, there exists a need in the relevant art to provide an adjustable fifth wheel hitch that is capable of overcoming the disadvantages of the prior art.

These and other advantages will become apparent from a reading of the following summary of the invention and description of the preferred embodiments in accordance with the principles of the present invention.

SUMMARY OF THE INVENTION

According to the principles of the present invention, an adjustable fifth wheel hitch for towing a fifth wheel trailer behind a vehicle is provided. The fifth wheel hitch of the present invention include a head assembly for engaging the trailer, a mounting assembly for coupling to the towing vehicle and at least one pivotable member that interconnects the head assembly to the mounting assembly. The pivotable members allow selective displacement of the head assembly relative to the mounting assembly between a forward position, typically for towing at higher speeds, and a maneuvering position, for towing at low speeds when sharp turning is desired. The head assembly can be locked relative to the mounting assembly at both the forward and rearward positions.

A particular advantage of the present invention over other adjustable fifth wheel hitches known in the art is that the path of movement of the head assembly relative to the mounting assembly is along an arcuate path as controlled by the length of the pivotable members that link the head assembly to the base or mounting assembly. Thus, rather than sliding or rolling in along a linear path as is common in the industry, the present fifth wheel hitch prevents binding of the head assembly relative to the mounting assembly as the head assembly swings between a forward position and a rearward position.

In one embodiment of the fifth wheel hitch of the present invention, the arcuate path of the head assembly relative to the mounting assembly is vertically oriented such that as the head assembly is displaced relative to the mounting assembly, the head assembly will vertically rise along the arcuate path relative to the mounting assembly and come to rest at either the forward position or rearward position depending upon the direction of displacement. Thus, the weight of the fifth wheel trailer upon the hitch assembly causes the head assembly to drop into place at either the forward or rearward position to ensure that the head assembly can be easily locked into place at either the forward or rearward positions.

One embodiment of the present invention includes a base assembly that includes a pair of base rails for mounting to a towing vehicle and a pair of elongate base members that are adjustably coupled to said pair of base rails. The pair of base rails is transversely oriented relative to the pair of elongate base members and can be selectively adjusted relative thereto to set the lateral position of the head assembly relative to the towing vehicle.

In another embodiment of the present invention, the head assembly and mounting assembly are coupled together with pivotable members in the form of "I" shaped members. The ends of the "I" shaped member are each pivotally coupled between the head assembly and the mounting assembly. The "I" shaped members are each comprised of an elongate member and a pair of transversely extending members with one of the pair of transversely extending members disposed on each end of the elongate member. Each transversely extending member is pivotally coupled at each end between the mounting assembly and the head assembly to allow movement of the head assembly relative to the base assembly as the "I" shaped members pivot. The elongate member that is attached between the two transversely extending members causes the two transversely extending members to pivot in tandem to prevent twisting of the head assembly as it moves between the forward position and the rearward position. Buttressing members may also be provided to add structural strength between the transversely extending members and the elongate members.

In yet another embodiment, a pair of head support members is each pivotally coupled to a respective side of the head assembly and each pivotally coupled to at least one of the plurality of pivotable members. Thus, the head assembly can pivot about a transversely extending axis of the head assembly relative to the mounting assembly. This allows the head assembly to pivot as the front of the fifth wheel trailer elevates or descends relative to the front of the towing vehicle. A pair of head support brackets may also be provided with each head support bracket pivotally coupled to a respective side of the head assembly and each vertically adjustable relative to a respective head support member.

In order to prevent lateral movement of the head assembly relative to the mounting assembly, one or more abutment members downwardly depend from each of the head support members. The abutment members may comprise of flat plates that are attached as by welding to the head assembly and that engage the sides of the base assembly when the head assembly has fully moved to either the forward or rearward positions. As the abutment members engage the sides of the mounting assembly, lateral movement of the head assembly relative to the mounting assembly is prevented.

In still another embodiment of the present invention, the forward position and rearward position are in substantially the same horizontal plane. Thus, as the head assembly is displaced relative to the base assembly, the head assembly, while moving along an arcuate path, has resting positions that are in the same plane such that the height of the fifth wheel trailer relative to the towing vehicle is substantially the same in both towing positions.

In yet another embodiment of the present invention, a latching mechanism is provided for locking the head assembly relative to the base assembly in either the forward or rearward position. The latching mechanism is comprised of a lever that is selectively moveable between a first position and a second position. At least one engaging member is coupled to the lever that engages with a curved abutment surface provided on at least one of the pivotable members. In addition, a biasing member is provided to the latching mechanism to bias the latching mechanism between the first and second positions. As such, the engaging member engages a first abutment surface to prevent movement of the head assembly relative to the base assembly when the head assembly is in the forward position, allows movement of the head assembly relative to the base assembly when released, and automatically reengages with a second abutment surface when the head assembly is in the rearward position to prevent relative movement between the head and base assemblies.

In yet another embodiment of a fifth wheel hitch according to the present invention, the base assembly is comprised of a pair of spaced apart base members for coupling relative to a towing vehicle. A pair of spaced apart head support members are pivotally coupled relative to the base members with at least two pivotable members. When the head support members are in the forward or rearward positions, the head support members rest upon their respective base support members with the head support members and base support members being substantially parallel. A head assembly in the form of a fifth wheel hitch is pivotally coupled to the head support members. The head assembly can be selectively displaced relative to the base members along an arcuate path defined by the pivotable members.

In still another embodiment of an adjustable fifth wheel hitch of the present invention, a pair of base rails are provided for mounting to the towing vehicle (e.g., to the bed of a pickup truck). The base members are laterally, adjustably coupled to the base rails and are transversely oriented relative thereto. Thus, the base members and the rest of the hitch assembly can be adjusted relative to the base rails.

The fifth wheel hitch of the present invention also includes a novel method of adjusting the fifth wheel hitch between a forward position and a rearward position. The method includes the step of coupling a head assembly of a fifth wheel hitch attached to a towing vehicle to a hitch attachment of a fifth wheel trailer. The method also includes the step of unlocking the fifth wheel hitch to allow movement of the head assembly from a first position to a second position relative to the towing vehicle. As the towing vehicle is moved relative to the fifth wheel trailer, the head assembly is caused to move along an arcuate path relative to the towing vehicle between a first position and a second position. Upon movement to the desired position, the fifth wheel hitch is locked in that position.

In the method of the present invention, the coupling may include attaching the head assembly to a king pin of a fifth wheel trailer. When unlocking, the head assembly is released relative to the mounting structure attached to the towing vehicle to allow movement of the head assembly. As the relative position of the towing vehicle to the fifth wheel trailer is changed, the head assembly swings from the first position to the second position. Upon completed movement to the second position, the fifth wheel hitch is locked in the second position by coupling the head assembly relative to the hitch mounting structure to prevent movement of said head assembly relative thereto.

The method may also include selectively latching the head assembly relative to the hitch mounting structure in either the forward or rearward position.

Further areas of applicability of the present invention will become apparent from the detailed description provided hereinafter. It should be understood that the detailed description and specific examples, while illustrating and describing certain embodiments that are believed to represent the best mode of the present invention, are intended for purposes of illustration only and are not intended to limit the scope of the invention.

BRIEF DESCRIPTION OF THE DRAWINGS

The foregoing summary, as well as the following detailed description of the illustrated embodiments is better understood when read in conjunction with the appended drawings. For the purpose of illustrating the invention, there is shown in the drawings embodiments that illustrate what is currently considered to be the best mode for carrying out the invention; it being understood, however, that the invention is not limited to the specific methods and instruments disclosed. In the drawings:

FIG. 4 is a perspective back and right side view of a latching mechanism in accordance with the principles of the present invention;

FIG. 5 is a perspective back and right side view of the latching mechanism illustrated in FIG. 4;

FIG. 12A is a back side view of a fifth embodiment of an adjustable fifth wheel hitch in accordance with the principles of the present invention;

FIG. 12B is a left side view of the adjustable fifth wheel hitch illustrated in FIG. 12A;

DETAILED DESCRIPTION OF THE INVENTION

Figure 1:
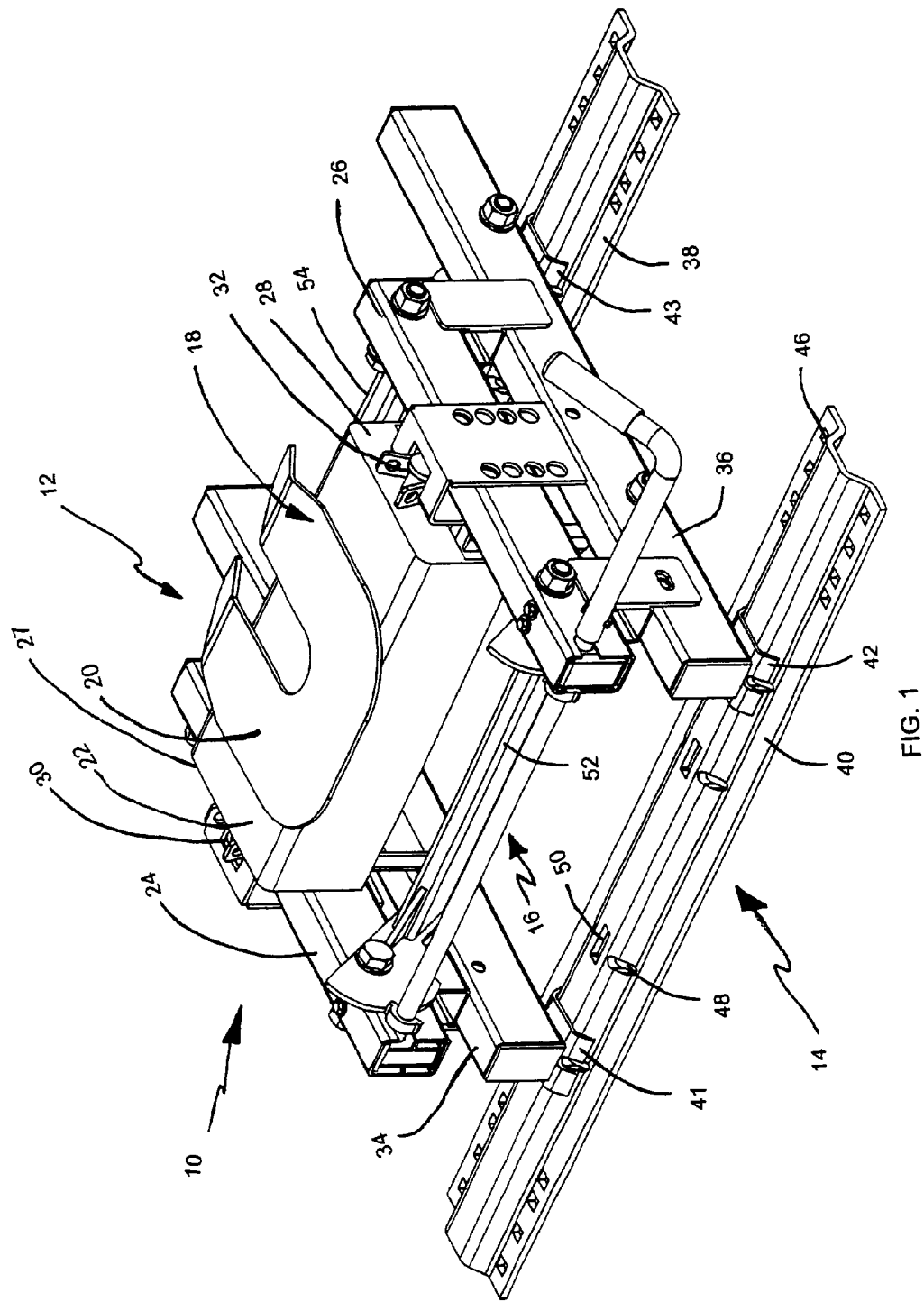
FIG. 1 is a perspective front and right side view of a first embodiment of an adjustable fifth wheel hitch in accordance with the principles of the present invention.

Referring now to the drawings, FIG. 1 illustrates a fifth wheel hitch, generally indicated at 10, in accordance with the principles of the present invention. The fifth wheel hitch is generally comprised of three components or assemblies of components. They include a head assembly, generally indicated at 12, a base or mounting assembly, generally indicated at 14, and a linkage assembly, generally indicated at 16, that couples the head assembly 12 to the mounting assembly 14. The head assembly 12 is configured for releasably coupling to a fifth wheel trailer (not shown). More specifically, the head assembly 12 is configured with a king pin type coupler 18 known in the art, which includes a receiver 20 supported by a support base 22. A pair of spaced apart elongate head support members 24 and 26 flank the first and second ends 27 and 28 of the support base 22. The elongate head support members 24 and 26 form support beams that are pivotally coupled to the support base 22, as with the trunnions 30 and 32. As used herein, the term trunnion describes a pin and receptacle arrangement that allows for pivotal movement of the pin relative to the receptacle. As the pin is fixedly attached to the support base 22, the support base 22 can rotate about a longitudinal axis to allow for pivotal movement of the receiver 20 relative to the towing vehicle (not shown).

The base assembly 14 is comprised of a spaced apart pair of elongate base members 34 and 36 that are parallel to and positioned below a respective head support members 24 and 26. The base members 34 and 36 are adjustably coupled to a pair of spaced apart rail members 38 and 40. The rail members 38 and 40 are configured to mount to the towing vehicle (not shown) and extend transversely to the base members 34 and 36. Coupling members 41, 42, 43 and 44 (not visible) secure the base members 34 and 36 to the rails 38 and 40. In particular, the rail members 38 and 40 are provided with apertures 46 for mounting the rail members 38 and 40 to the towing vehicle. Aperture 50 is configured to receive a tab depending from the bottom of the coupling member 41 through which a fastener (not shown) can pass through the aperture 48 and secure the coupling member 41 to the rail 40 at that location. As such, depending upon the position of the coupling member 41 relative to the rail 40, the lateral position of the base assembly 14 can be adjusted.

The head assembly 16 is pivotally coupled to the base assembly 14 with linkage assembly 16 comprised of pivotable members or arms 52 and 54. As will be described in more detail, upon movement of the head assembly 12 relative to the base assembly 14, the head assembly 12 will travel in an arcuate path as dictated by the radial path of the ends of the pivotable arms 52 and 54 coupled to the head assembly 12. The displacement of the head assembly 12 relative to the base assembly is only limited by the engagement of the head assembly 12 relative to the base assembly between a first forward position as shown and a second rearward position as the head assembly 12 moves along the arcuate path.

Figure 2:
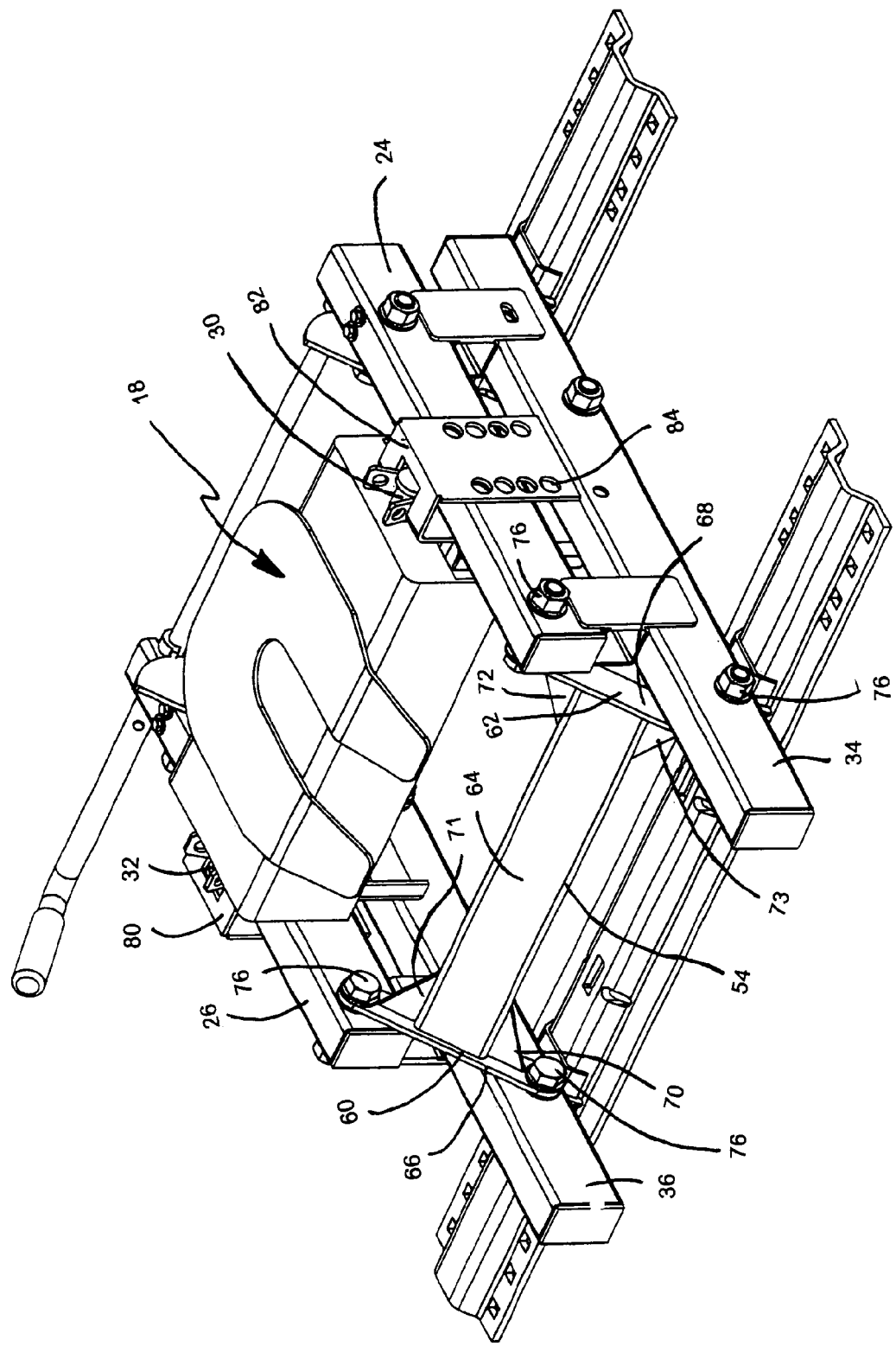
FIG. 2 is a perspective back and left side view of the adjustable fifth wheel hitch shown in FIG. 1.

As is better visible in FIG. 2, the pivotable arm 54 is comprised of an "I" shaped member having a first end 60 pivotally coupled between the base member 36 and the head support member 26. The "I" shaped arm 54 includes an elongate cross-member 64 attached to a pair of transversely extending pivot members 66 and 68 disposed on each end 60 and 62, respectively, of the cross-member 64. The arm 54 pivots about the pivot members 66 and 68 as each end of each pivot member 66 and 68 is rotatably coupled to and between its base and head support members 36 and 26 and 34 and 24, respectively. The pivot members 66 and 68 are rotatably coupled as with threaded fasteners 76 that engage holes formed in the head support members 24 and 26, base support members 34 and 36 and pivot members 66 and 68 as illustrated.

Buttressing members 70, 71, 72 and 73 are disposed between the cross-member 64 and the pivot members 66 and 68. The arm 54 may be integrally formed, or more likely, welded together from individual plate steel components.

As further illustrated in FIG. 2, the coupler 18 is vertically adjustable relative to the head support members 24 and 26 with head support brackets 80 and 82. The brackets 80 and 82 are coupled to the trunnions 30 and 32 and fit along each outer side of the head support members 24 and 26. A plurality of holes 84 are provided in each bracket 80 and 82 to allow for various discrete positioning of the brackets 80 and 82 relative to the head support members 26 and 24, respectively. Once the height of the coupler 18 is adjusted relative to the head support members 24 and 26, a pin or threaded fastener can be inserted through one or more of the holes 84 in each bracket 80 and 82 and into corresponding holes in the head support members 24 and 26 to rigidly hold the brackets 80 and 82 relative to their respective head support members 26 and 24, respectively.

Figure 3:
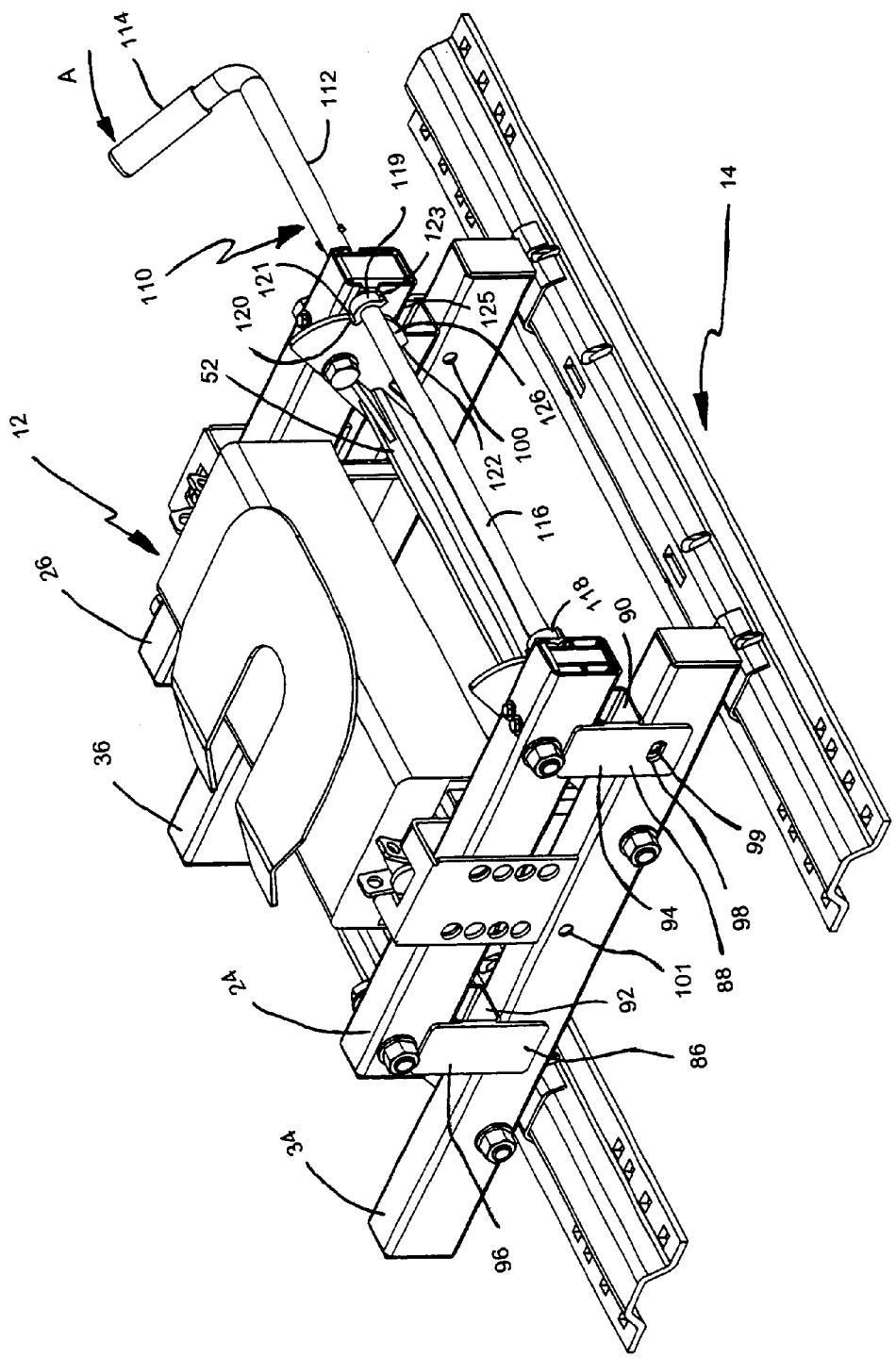
FIG. 3 is a perspective front and left side view of the adjustable fifth wheel hitch shown in FIG. 1.

Referring now to FIG. 3, when the head assembly is in a resting position, such as the forward position shown, the head support members 24 and 26 rest upon the base support members 34 and 36, respectively. This is also the case, as will be shown and described herein, when the head assembly has moved to the rearward position. In order to prevent lateral movement of the head assembly 12 relative to the base support members 34 and 36, abutment members 86 and 88 are provided on both sides of the head assembly 12. In this embodiment, the abutment members 86 and 88 are comprised of tubular spacers 90 and 92 that are attached to the head support members 24 and 26. Flat plate members 94 and 96 are attached to the tubular spacers 90 and 92, respectively, with the plate members 94 and 96 depending from the head support member 24 and extending downwardly from the sides of the head support members 24 and 26 to the sides of the base members 34 and 36. Thus, any significant lateral movement of the head assembly 12 is prevented as the abutment members 86 and 88 will engage the sides of the base members 34 and 36.

The abutment member 88 also serves the dual purpose of providing a locking mechanism to prevent movement of the head assembly 12 relative to the base assembly 14. The abutment member 88 is provided with an aperture 98 that coincides with an aperture 99 formed in the base member 34 when the head assembly 14 is in a forward position as illustrated. A pin or threaded fastener (not shown) can be inserted through the apertures 98 and 99 to hold the abutment member 88 and thus the head support member 24 relative to the base member 34. A similar aperture 100 arrangement is provided with respect to the base member 36. When the head assembly 12 is released and allowed to move to a second, rearward position, a second aperture 101 is provided in the base member 34 to align with the aperture 98. Similarly, a pin or bolt may be inserted through the apertures 98 and 101 to prevent relative vertical movement of the head support member 24 relative to the base member 34. Since the head support members 24 and 26 effectively rest upon their respective base members 34 and 36, and since the base members 34 and 36 define relatively flat top surfaces, the head assembly will be in substantially the same horizontal plane when resting in either the forward position as shown or the rearward position. As such, the height of the fifth wheel trailer relative to the towing vehicle will not change in either towing position.

Again with reference to FIG. 3, in addition to the ability to secure or lock the head assembly 12 relative to the base assembly 14, the head assembly 12 is releasably latchable relative to the base assembly 14 with a latching assembly mechanism, generally indicated at 110. The latching mechanism 110 is comprised of an elongate lever 112 having a handle portion 114 and a shaft portion 116 rotatably coupled to and between the head support members 24 and 26. Abutment members 118 and 119 are attached to the shaft portion 116 of the lever 112. Each abutment member 118 and 119 is comprised of a semi-cylindrical member having two protrusions 121 and 123 extending therefrom on opposite sides. The protrusions engage with abutment surfaces 120 and 122 of the pivotable arm 52 to prevent movement of the pivotable arm 52 when the protrusions 121 and 123 engage the abutment surface 120 and 122. As shown, the abutment surfaces are in the form of notches in the outer edge of a semicircular portion 126 of the arm 52. The circumferential distance between the two notches are such that one of the protrusions 121 and 123 of the abutment members will engage with a respective notch when the head assembly 12 is in either the forward or rearward position. In addition, the lever 112 is biased in two directions. That is, in the forward position as shown, the lever is biased in the direction of arrow A'. As the handle 114 is rotated in a direction opposite to arrow A', upon passing a cross-over point, the handle 114 will be biased in the opposite direction. As such, the protrusion 121 engaging the notch 120 will be disengaged and the opposite protrusion 123 will ride along the curved surface 125 extending between the two notches 120 and 122. When the head assembly 12 reaches its full resting position at the rearward position, the protrusion 123 will engage with notch 122 to prevent movement of the arm 52 in the opposite direction. Because the lever 112 is biased in two directions, the protrusions 121 and 123 will automatically snap into the notches when the head assembly moves from one position to the other. As shown, both ends of the arm 52 are configured to engage with respective abutment members of lever 112. Once positioned, the head support members 24 and 26 can be further secured relative to the base members 34 and 36 as previously described herein.

As further illustrated in FIGS. 4 and 5, the latching mechanism 110 is supported relative to the head support members 24 and 24 (see FIG. 3) with first and second mounting assemblies 130 and 132. Each mounting bracket 130 and 132 is sized and configured to fit within its respective head support member and be bolted or otherwise attached thereto as with threaded fasteners 134. The bracket 130 merely provides a support for the shaft portion 112 of the lever that allows for relatively free rotation of the lever 110 relative thereto. The abutment member 119 is attached to the shaft portion 112 proximate the bracket 130. The distal end 136 of the shaft portion 112 is provided with a flat surface on one side thereof to provide a non-cylindrical end for engaging with a first lever arm 140. The first lever arm 140 is pivotally coupled to a second lever arm 142 that is biased about a center axle 144 relative to the mounting bracket 146.

As shown in FIG. 5, the center axle 144 is biased with a biasing member 145 in the form of a coil spring toward the first lever arm 140. A slot or channel 148 is provided in the outer housing 150 of the mounting bracket 132 to allow the second lever arm 142 to move relative to the first lever arm 140 as the first lever arm 140 rotates. The slot 148 is linearly aligned with the center of rotation of the first lever arm 140. As such, the lever handle will be biased in a direction depending upon the position of the pivot point relative to the first and second lever arms 140 and 142, respectively. That is, if the pivot point 152 is to one side of a line intersecting the centers of rotation of the first and second lever arms 140 and 142, the shaft 112 will be biased in that direction.

Figure 6:
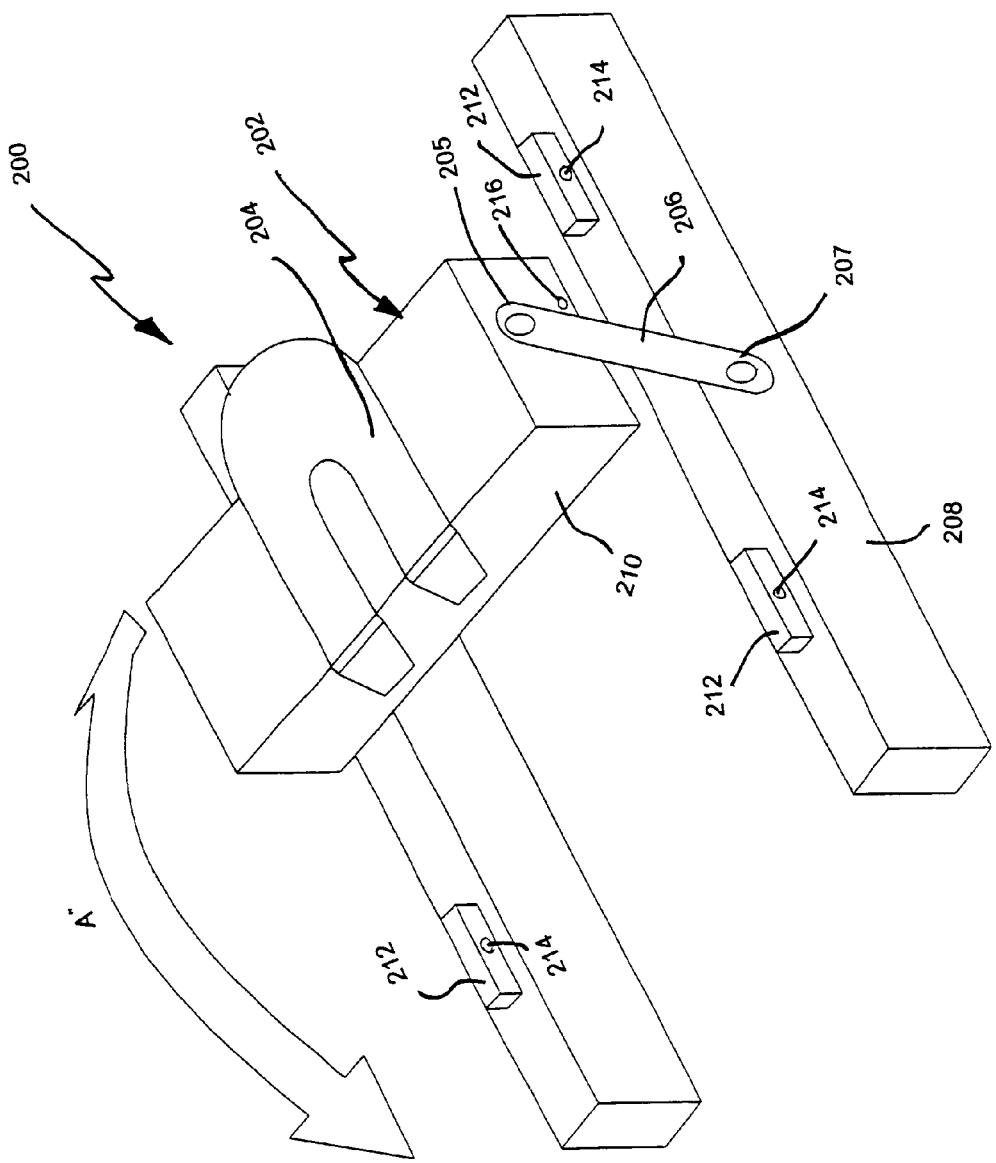
FIG. 6 is a perspective back and left side view of a second embodiment of an adjustable fifth wheel hitch in accordance with the principles of the present invention.

Referring now to FIG. 6, there is shown a second embodiment of an adjustable hitch assembly, generally indicated at 200, in accordance with the principles of the present invention. The hitch assembly 200 is comprised of a head assembly 202 having a fifth wheel type hitch receiver 204 attached thereto and pivotally coupled proximate to a first end 205 of a pivotable arm 206 (a second arm not visible is provide on the opposite side of the head assembly 202). The pivotable arm 206 is pivotably coupled proximate a second end 207 to a base member 208. As such, the head assembly 202 can move along an arcutate path as shown by arrow A" between a first forward position and a second rearward position. The head assembly 202 is comprised of a support base 210 having a box-like structure with the bottom (not shown) of the support base being open. Attachment blocks 212 are provided to engage the interior surface of the support base 210 to prevent lateral movement of the support base 210 when the support base is in the first or second positions. Once engaged, apertures 214 are provided in the attachment blocks 212 so that a pin or fastener can be inserted through the aperture 216 in the support base 210 and through the attachment block 212 to prevent movement of the support base 210 relative to the base member 208.

Figure 7:
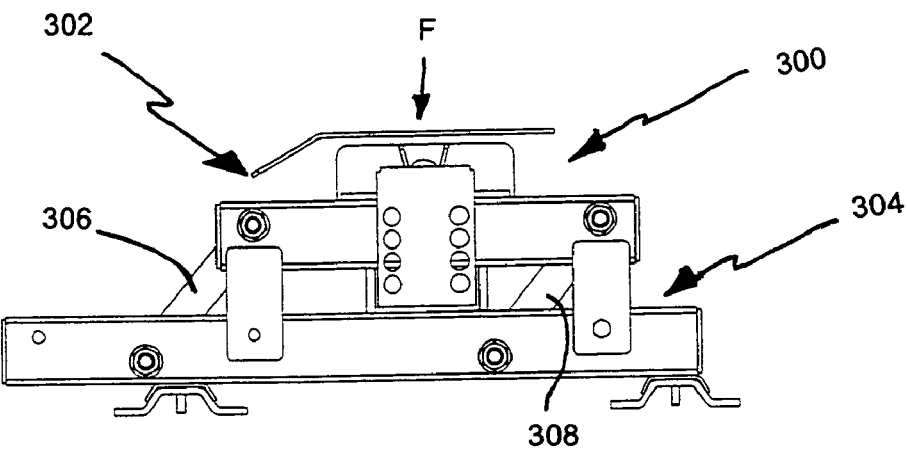
FIGS. 7, 8 and 9 are left side views of a third embodiment of an adjustable fifth wheel hitch in accordance with the principles of the present invention showing the arcuate patch of the hitch between a forward position and a rearward position.
Figure 8:
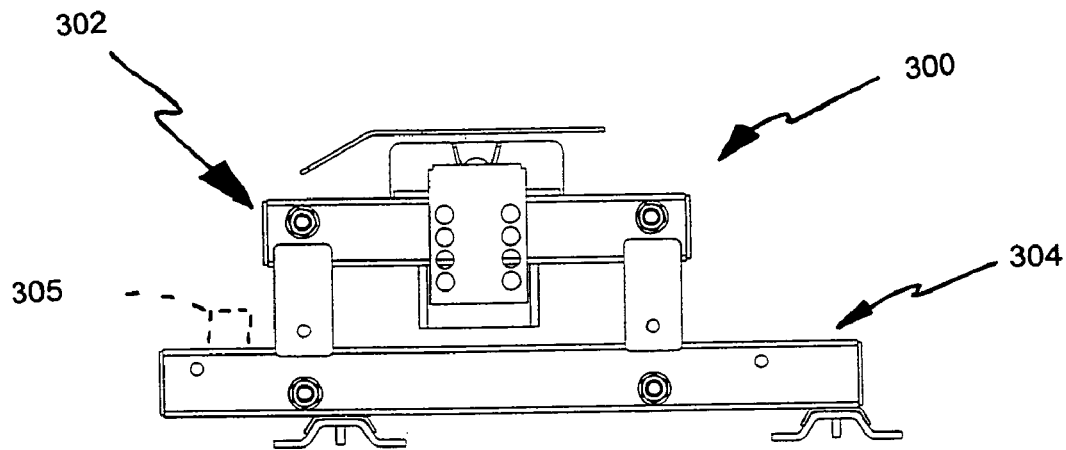
Figure 9:
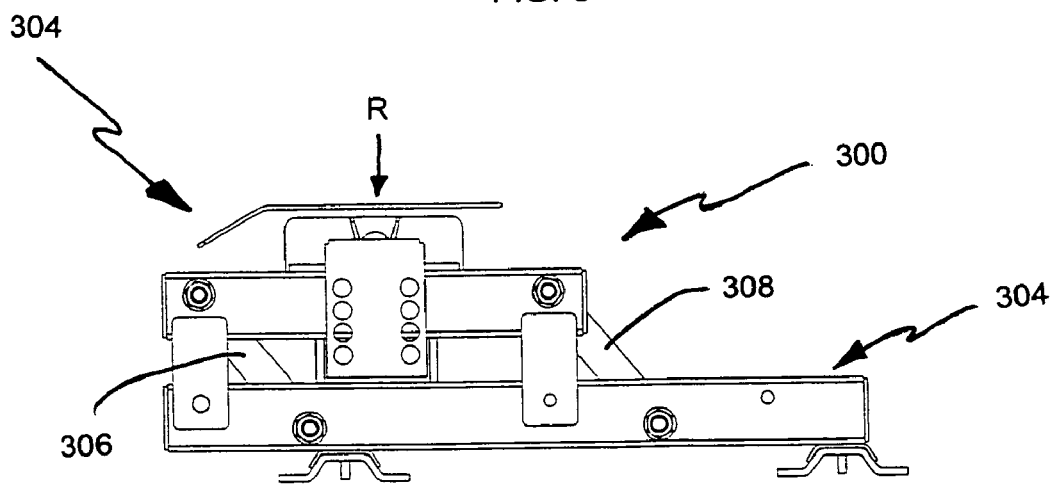

As shown in FIGS. 7, 8 and 9, an adjustable fifth wheel hitch, generally indicated at 300, according to the present invention is capable of displacement between a first forward position, indicated at F and a second rearward position indicated at R. The head assembly 302 is in the same horizontal plane when the head assembly 302 is in either the F position or the R position. In some circumstances, however, it may be desirable to provide a more elevated position of the head assembly 304 when positioned in the R position to increase maneuverability by increasing the vertical clearance between the overhang of the fifth wheel trailer and the towing vehicle. In such circumstances, a spacer 305 (shown in dashed lines in FIG. 8) may be provided between the head assembly 302 and the base assembly 304 at the R position to position the head assembly at a slightly higher elevation. This arcuate movement of the head assembly 302 relative to the base assembly 304, rather than a sliding, linear movement, provides a smooth and non-binding transition of the head assembly 302 between the F position and the R position as the head assembly 302 raises (as shown in FIG. 8) and lowers to the desired position (as shown in FIGS. 7 and 9) about the pivoting arms 306 and 308.

Figure 10:
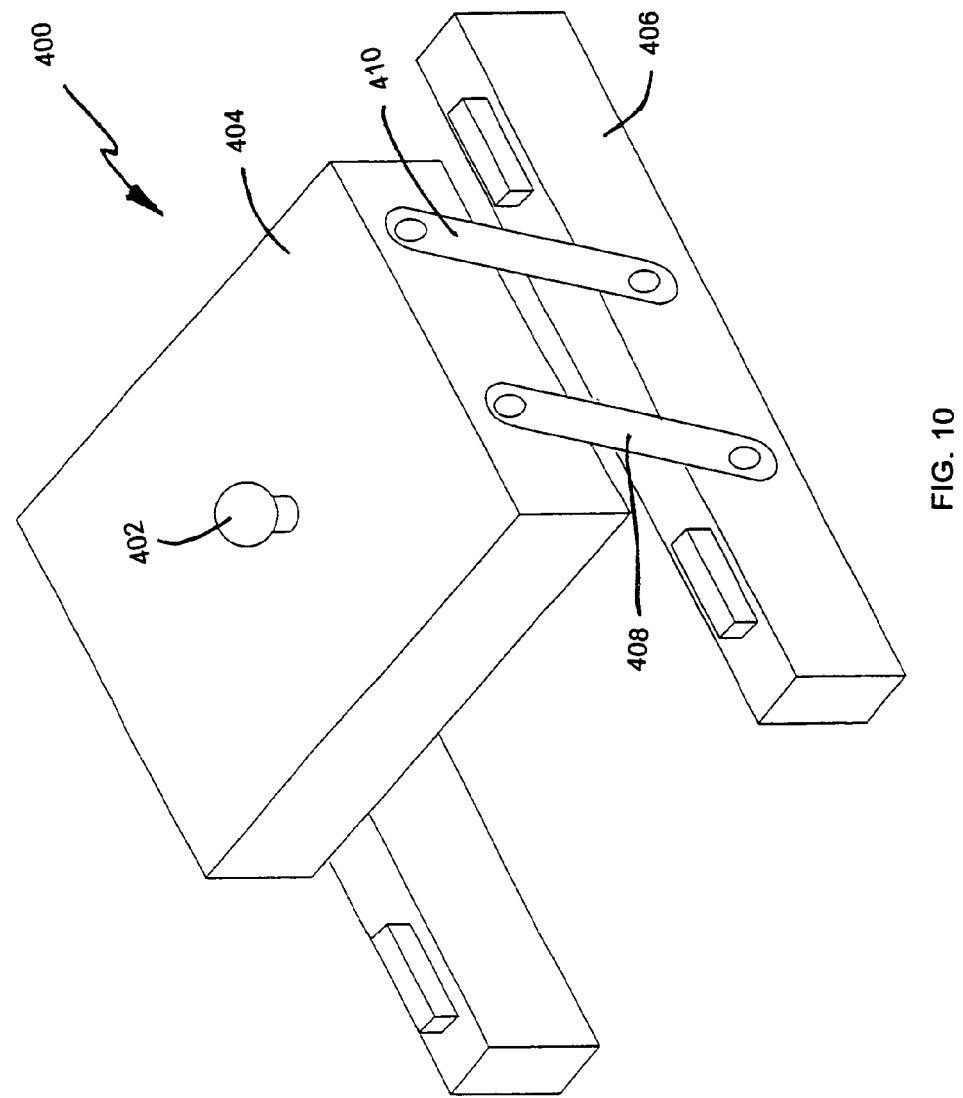
FIG. 10 is a perspective side view of a fourth embodiment of an adjustable fifth wheel hitch in accordance with the principles of the present invention.

It is contemplated in accordance with the present invention that the fifth wheel hitch may take on various configurations and include various types of hitches known in the art. For example, as shown in FIG. 10, an adjustable fifth wheel hitch, generally indicated at 400, is illustrated. In this embodiment, the king pin type hitch previously illustrated has been replaced with a ball hitch 402. The ball hitch 402 is coupled to a head assembly 404 that is pivotally coupled to a base assembly 406 with pivotable arms 408 and 410. As such, the present invention is intended to cover all types of hitching arrangements wither the hitch may have applicability.

Figure 11:
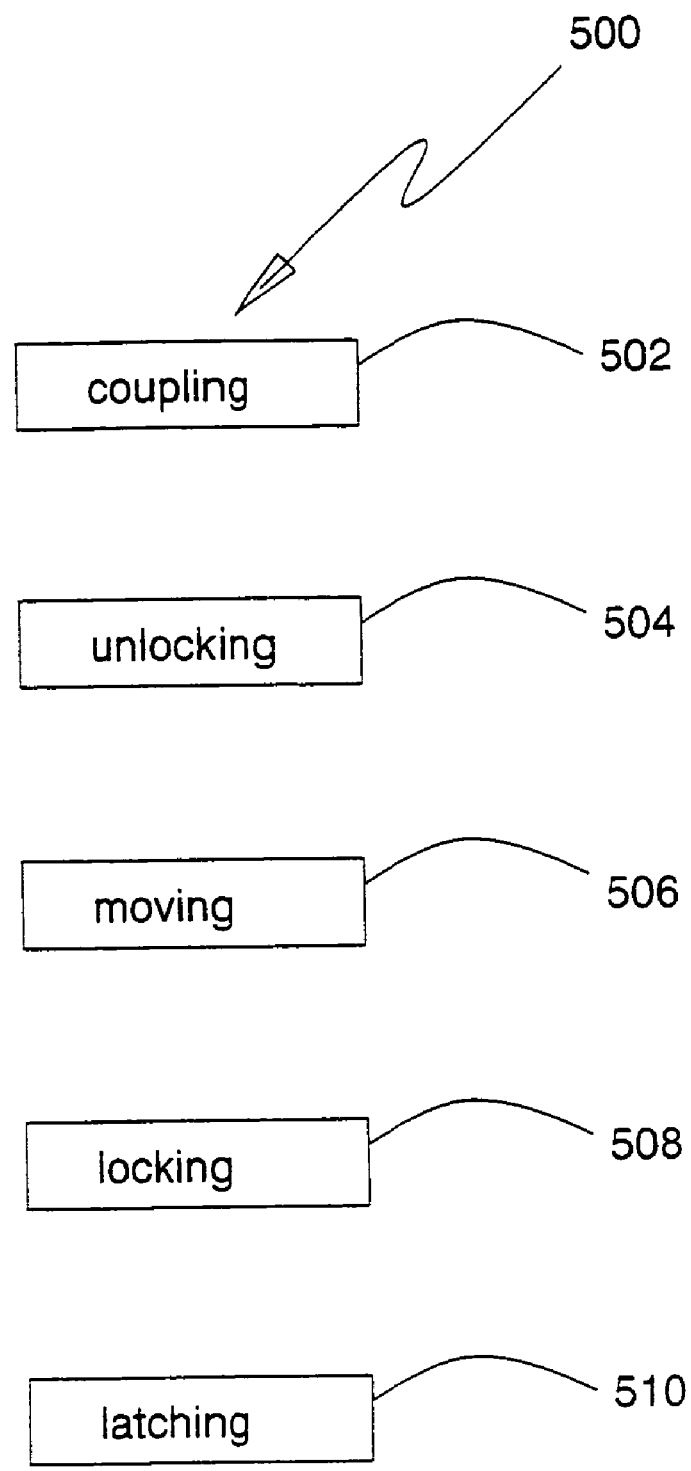
FIG. 11 is a schematic flow diagram of a method of adjusting an adjustable fifth wheel hitch in accordance with the principles of the present invention.

As illustrated in FIG. 11, a method, generally indicated at 500, of moving a fifth wheel hitch between a forward position and a rearward position comprises coupling 502 a head assembly of a fifth wheel hitch attached to a towing vehicle to a hitch attachment of a fifth wheel trailer, unlocking 504 the fifth wheel hitch to allow movement of the head assembly from a first position to a second position relative to the towing vehicle, moving 506 the towing vehicle relative to the fifth wheel trailer to cause movement along an arcuate path of the head assembly relative to the towing vehicle between the first position and the second position, and locking 508 the fifth wheel hitch in the second position. The coupling 502 comprises attaching the head assembly to a king pin of a fifth wheel trailer. The unlocking 504 comprises releasing the head assembly relative to a hitch mounting structure attached to the towing vehicle. The moving 506 comprises changing the relative position of the towing vehicle to the fifth wheel trailer as the head assembly swings from the first position to the second position. The locking 508 locking the fifth wheel hitch in the second position comprises coupling the head assembly relative to the hitch mounting structure to prevent movement of the head assembly relative thereto. Finally, the method includes latching 510 the head assembly relative to the hitch mounting structure in one of the forward and rearward positions.

FIGS. 12A and 12B illustrate yet another embodiment of an adjustable fifth wheel hitch, generally indicated at 600, in accordance with the principles of the present invention. The hitch 600 is comprised of a mounting assembly 602 for attaching to the bed of a pickup truck (not shown). The base assembly 602 includes left and right base members 604 and 606, respectively, to which forward and rearward resting supports 608', 608" and 610', 610" are attached. A head assembly 612 is pivotally coupled to the base members 604 and 606 with a linkage assembly, generally indicated at 611, comprised of a single pivotable arm 614. The pivotable arm 614 is rotatably coupled to and between the base members 604 and 606 proximate a first end 616 and rotatably coupled to the head assembly 612 proximate a second end 618. The attachment of the head assembly 612 to a king pin (not shown) of a fifth wheel trailer will maintain the generally horizontal orientation of the head assembly 612 throughout is pivotal movement.

Figure 14:
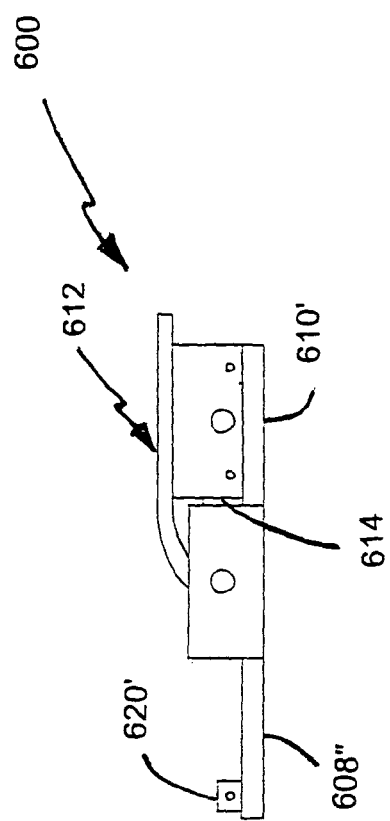
FIG. 14 is a left side view of the adjustable fifth wheel hitch illustrated in FIG. 12B in a forward position.
Figure 13:
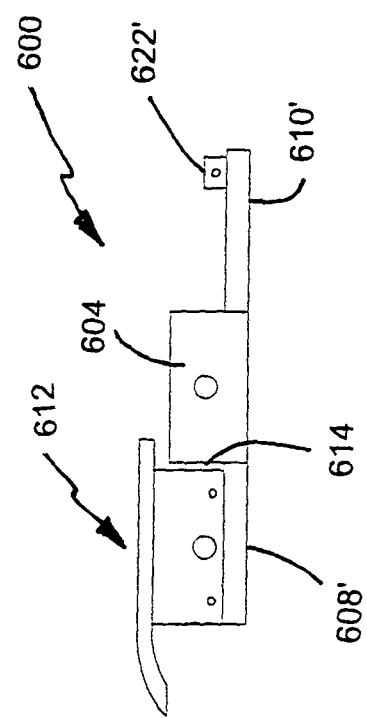
FIG. 13 is a left side view of the adjustable fifth wheel hitch illustrated in FIG. 12B in a rearward position.

As shown in FIG. 13, the head assembly 612 can be displaced to a rearward resting position as the arm 614 pivots about the base member 604. In the rearward position, the head assembly 612 can be coupled to the attachment tabs 620' and 620" depending from the rearward resting supports 608' and 608" by inserting a pin or bolt through the concentric holes provided in the head assembly and tabs 620' and 620". Likewise, when the head assembly 612 is positioned in the forward position, as shown in FIG. 14, the head assembly 612 can be coupled to the attachment tab 622' (see FIG. 13). In both cases, the head assembly is vertically supported by the respective rearward or forward resting arms 608 or 610. In addition to providing a means for attaching the head assembly 612 to the base assembly 602, the tabs 620 and 622 provide additional lateral support and stability to the head assembly 612 by abutting the inside of the head assembly 612 as the head assembly rests upon the corresponding resting arms.

It is noted that the components from which the adjustable fifth wheel hitch of the present invention may be formed from common steel plate and tubing, aluminum or other materials known in the art. For example, the head support members and base members may be formed from square or rectangular steel tubing. Likewise, other components may be formed from steel plate that is cut and welded into the various illustrated components forming the fifth wheel hitch of the present invention.

While the apparatus and method of the present invention have been described with reference to certain illustrated embodiments to describe what is believed to be the best mode of the invention, it is contemplated that upon review of the present invention, those of skill in the art will appreciate that various modifications and combinations may be made to the present embodiments without departing from the spirit and scope of the invention as recited in the claims. The claims provided herein are intended to cover such modifications and combinations and all equivalents thereof. Reference herein to specific details of the illustrated embodiments is by way of example and not by way of limitation.

What is claimed is:

1. A fifth wheel hitch, comprising:
   a base assembly configured for mounting to a towing vehicle;
   at least one head support;
   at least one pivotable member pivotally coupled to said base assembly at a first end and pivotally coupled to said at least one head support at a second end, wherein the entire at least one head support is translationally movable relative to the base assembly;

a coupler configured for coupling to a fifth wheel trailer, the coupler being pivotally coupled to the at least one head support and rotatable relative to the at least one head support and base assembly, whereby said coupler and said entire at least one head support can travel translationally relative to said base assembly in an arcuate path between a forward position and a rearward position as the at least one pivotable member pivots about the base assembly; and a locking mechanism for locking said coupler relative to said base assembly in said forward and rearward positions, the locking mechanism preventing movement of the at least one head support relative to the base assembly.

2. The fifth wheel hitch of claim 1, wherein said base assembly is comprised of a pair of base rails for mounting to the towing vehicle and a pair of elongate base members adjustably coupled to said pair of base rails, said pair or base rails transversely oriented relative to said pair of elongate base members.

3. The fifth wheel hitch of claim 1, wherein said at least one pivotable member comprises an "I" shaped member having a first end pivotally coupled between said base assembly and said head assembly.

4. The fifth wheel hitch of claim 3, wherein said "I" shaped member comprises an elongate member and a pair of transversely extending members, one of said pair of transversely extending members disposed on each end of said elongate member.

5. The fifth wheel hitch of claim 4, wherein said "I" shaped member further comprises buttressing members disposed between said pair of transversely extending members and said elongate member.

6. The fifth wheel hitch of claim 1, wherein the at least one head support comprises a pair of head support members between which the coupler is positioned.

7. The fifth wheel hitch of claim 6, further comprising a pair of head support brackets each pivotally coupled to a respective side of said coupler and each adjustably coupled to a respective head support member.

8. The fifth wheel hitch of claim 6, further comprising at least one abutment member downwardly depending from each of said pair of head support members for engaging said base assembly in said forward and rearward positions for preventing lateral movement of said head assembly relative to said base assembly.

9. The fifth wheel hitch of claim 1, wherein the base assembly is configured for mounting to a relatively flat surface of the towing vehicle, and wherein the at least one head support is configured to extend parallel to the relatively flat surface of the towing vehicle in both the first and second positions.

10. The fifth wheel hitch of claim 1, further comprising a latching mechanism for locking said coupler relative to said base assembly in one of said forward position and said rearward position.

11. The fifth wheel hitch of claim 10, wherein said latching mechanism is comprised of a lever selectively moveable between a first position and a second position, at least one engaging member coupled to said lever, first and second abutments depending from the at least one pivotable member, said engaging member abutting said first abutment when said coupler is in said forward position to retain the coupler in the first position and abutting said second abutment when said coupler is in said rearward position to retain the coupler in the second position.

12. The fifth wheel hitch of claim 11, wherein said latching mechanism further comprises a biasing member to bias said at least one engaging member into contact with one of said first and second abutments.

13. The fifth wheel hitch of claim 1, wherein the base assembly is configured for mounting to a relatively flat surface of the towing vehicle, and wherein the at least one head support is configured to remain parallel to the relatively flat surface of the towing vehicle as the coupler and the at least one head support travels between the forward and rearward positions.

14. A fifth wheel hitch, comprising:
mounting means for mounting to a towing vehicle;
hitch means for receiving a fifth wheel trailer;
hitch support means for supporting said hitch means;
coupling means pivotally coupled to said mounting means at a first pivotable connection and to said hitch support means at a second pivotable connection, wherein the entire hitch support means is translationally movable relative to the base assembly, said hitch means being pivotally coupled to said hitch support means, the hitch means and the entire hitch support means being capable of traveling translationally relative to said mounting means along an arcuate path between a forward position and a rearward position as the coupling means pivots about the mounting means; and locking means for locking said hitch means relative to said mounting means in said forward and rearward positions, the locking means preventing movement of the hitch support means relative to the mounting means.

15. The fifth wheel hitch of claim 14, wherein said mounting means comprises a base assembly configured for mounting to a towing vehicle.

16. The fifth wheel hitch of claim 14, wherein said hitch means comprises a head assembly configured for coupling to a fifth wheel trailer.

17. The fifth wheel hitch of claim 14, wherein said coupling means comprises a plurality of pivotable members, pivotally coupling said mounting means to said hitch means.

18. The fifth wheel hitch of claim 14, wherein said mounting means is comprised of a pair of base rails for mounting to the towing vehicle and a pair of elongate base members adjustably coupled to said pair of base rails, said pair of base rails transversely oriented relative to said pair of elongate base members.

19. The fifth wheel hitch of claim 14, wherein said coupling means comprises at least one "I" shaped member having a first end pivotally coupled between said mounting means and said hitch means.

20. The fifth wheel hitch of claim 19, wherein each said "I" shaped member comprises an elongate member and a pair of transversely extending members, one of said pair of transversely extending members disposed on each end of said elongate member.

21. The fifth wheel hitch of claim 20, wherein said "I" shaped member further comprises buttressing members disposed between said pair of transversely extending members and said elongate member.

22. The fifth wheel hitch of claim 14, wherein the mounting means is configured for mounting to a relatively flat surface of the towing vehicle, and wherein said hitch support means is configured to remain parallel to the relatively flat surface of the towing vehicle as the hitch means and hitch support means travels between the forward and rearward positions.

23. The fifth wheel hitch of claim 14, further comprising a pair of hitch support brackets, each pivotally coupled to a respective side of said hitch means and each adjustably coupled to said hitch support means.

24. The fifth wheel hitch of claim 14, further comprising abutment means for engaging said mounting means and preventing lateral movement of said hitch means relative to said mounting means when said hitch means is in said forward position and said rearward position.

25. The fifth wheel hitch of claim 14, wherein the mounting means is configured for mounting to a relatively flat surface of the towing vehicle, and wherein said hitch support means is configured to extend parallel to the relatively flat surface of the towing vehicle in both the first and second positions.

26. The fifth wheel hitch of claim 14, further comprising latching means comprising a lever selectively moveable between a first position and a second position, at least one engaging member coupled to said lever, and first and second abutments depending from said coupling means, said engaging member abutting said first abutment when said hitch means is in said forward position to retain said hitch means in the first position and abutting said second abutment when said hitch means is in said rearward position to retain said hitch means in the second position.

27. The fifth wheel hitch of claim 26, wherein said latching means further comprises a biasing member to bias said at least one engaging member into contact with one of said first and second abutments.

28. A fifth wheel hitch, comprising:
    a pair of spaced apart base members for coupling relative to a towing vehicle;
    at least two pivotable members, each coupled to at least one of said pair of spaced apart base members;
    a head assembly coupled to the at least two pivotable members, said head assembly being translatable between a forward position and a rearward position along an arcuate path defined by said at least two pivotable members; and
    a latching mechanism comprising a lever selectively moveable between a first position and a second position, at least one engaging member coupled to said lever, and first and second abutments depending from at least one of said at least two pivotable members, said engaging member abutting said first abutment when said head assembly is in said forward position to retain said head assembly in said forward position and abutting said second abutment when said head assembly is in said rearward position to retain said head assembly in said rearward position.

29. The fifth wheel hitch of claim 28, further comprising a pair of base rails for mounting to the towing vehicle, said pair of spaced apart base members adjustably coupled to said pair of base rails, said pair of base rails transversely oriented relative to said pair of spaced apart base members.

30. The fifth wheel hitch of claim 28, wherein said at least two pivotable members each comprise an "I" shaped member having a first end pivotally coupled between said pair of spaced apart base members and said head assembly.

31. The fifth wheel hitch of claim 30, wherein each said "I" shaped member comprises an elongate member and a pair of transversely extending members, one of said pair of transversely extending members disposed on each end of said elongate member.

32. The fifth wheel hitch of claim 31, wherein said "I" shaped member further comprises buttressing members disposed between said pair of transversely extending members and said elongate member.

33. The fifth wheel hitch of claim 28, further comprising said pair of head support members, each pivotally coupled to a respective side of said head assembly and each pivotally coupled to at least one of said at least two pivotable members.

34. The fifth wheel hitch of claim 33, further comprising a pair of head support brackets, each pivotally coupled to a respective side of said head assembly and each adjustably coupled to a respective head support member.

35. The fifth wheel hitch of claim 34, further comprising at least one abutment member downwardly depending from each of said pair of head support members for engaging said base assembly in said forward and rearward positions for preventing lateral movement of said head assembly relative to said base assembly.

36. The fifth wheel hitch of claim 28, wherein said forward position and said rearward position are in substantially the same horizontal plane.

37. The fifth wheel hitch of claim 28, wherein said latching mechanism further comprises a biasing member to bias said at least one engaging member into contact with one of said first and second abutments.

38. A method of moving a fifth wheel hitch between a forward position and a rearward position, comprising:
    coupling a head assembly of a fifth wheel hitch attached to a towing vehicle to a hitch attachment of a fifth wheel trailer;
    unlocking the fifth wheel hitch to allow movement of the head assembly from a first position to a second position relative to the towing vehicle;
    moving the towing vehicle relative to the fifth wheel trailer to cause movement along an arcuate path of the head assembly relative to the towing vehicle between the first position and the second position; and
    locking said fifth wheel hitch in said second position;
    wherein moving the towing vehicle comprises:
        pivoting a linking member relative to the tow vehicle and a head support; and
        pivoting at least a portion of the head assembly relative to the head support.

39. The method of claim 38, wherein said coupling comprises attaching the head assembly to a king pin of a fifth wheel trailer.

40. The method of claim 38, wherein said unlocking comprises releasing said head assembly relative to a hitch mounting structure attached to the towing vehicle.

41. The method of claim 40, wherein said locking said fifth wheel hitch in said second position comprises coupling said head assembly relative to said hitch mounting structure to prevent movement of said head assembly relative thereto.

42. The method of claim 40, further comprising latching said head assembly relative to said hitch mounting structure in one of said forward and said rearward positions.

43. The method of claim 38, wherein said moving comprises changing the relative position of the towing vehicle to the fifth wheel trailer as the head assembly swings from said first position to said second position.

* * * * *